United States Patent
Oyanagi et al.

(10) Patent No.: US 6,986,962 B2
(45) Date of Patent: Jan. 17, 2006

(54) BASIC POLYMER ELECTROLYTE FUEL CELL

(75) Inventors: Hiroyuki Oyanagi, Iruma-gun (JP); Minako Onodera, Bunkyo-ku (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/187,503

(22) Filed: Jul. 1, 2002

(65) Prior Publication Data

US 2003/0013004 A1 Jan. 16, 2003

(30) Foreign Application Priority Data

Jul. 2, 2001 (JP) .............................. 2001-201445

(51) Int. Cl.
*H01M 4/86* (2006.01)
(52) U.S. Cl. ..................... 429/40; 429/33; 429/34; 429/46
(58) Field of Classification Search ................. 429/40, 429/44, 41, 46, 34, 33
See application file for complete search history.

(56) References Cited

U.S. PATENT DOCUMENTS

| 5,346,780 A | * | 9/1994 | Suzuki ..................... 429/42 |
| 5,525,436 A | | 6/1996 | Savinell et al. ............. 429/30 |
| 5,593,934 A | * | 1/1997 | Stonehart ................... 502/326 |
| 6,703,152 B2 | * | 3/2004 | Komiya et al. ............. 429/24 |
| 2002/0045090 A1 | * | 4/2002 | Oyanagi et al. ............. 429/46 |

* cited by examiner

*Primary Examiner*—Raymond Alejandro
(74) *Attorney, Agent, or Firm*—Lahive & Cockfield, LLP; Anthony A. Laurentano, Esq.

(57) ABSTRACT

A fuel cell has a unit cell whose output is increased. A unit cell of a fuel cell includes a cathode electrode having a gas diffusion layer and an electrode catalyst layer. The electrode catalyst layer is made of carbon black carrying a Pt—Mn-based alloy such as a Pt—Mn alloy on its particle surface. For operating the fuel cell which includes the cathode electrode, it is preferable to make the pressure of an oxygen-containing gas supplied to the cathode electrode higher than the pressure of an hydrogen-containing gas supplied to an anode electrode to make the pressure at the cathode electrode higher than the pressure at the anode electrode.

12 Claims, 9 Drawing Sheets

BASIC POLYMER ELECTROLYTE FUEL CELL

BACKGROUND OF THE INVENTION

1. Field of the Invention

The present invention relates to a fuel cell, and more particularly to a fuel cell which is constructed at a low cost and which is capable of producing a high electric power output even at a large current density.

2. Description of the Related Art

FIG. 8 of the accompanying drawings shows in vertical cross section a unit cell of a general phosphoric acid fuel cell which is one of presently available fuel cells. The unit cell, denoted at 1, has an electrolyte electrode assembly 5 which comprises an anode electrode 2, a cathode electrode 3, and an electrolyte 4 interposed between and joined to the electrodes 2, 3.

The electrolyte 4 comprises a polymer membrane made of a basic polymer such as polybenzimidazole and impregnated with a liquid electrolyte. See U.S. Pat. No. 5,525,436 for details. The liquid electrolyte may, for example, be phosphoric acid, sulfuric acid, methanesulfonic acid, or the like which conducts hydrogen ions.

As shown in FIG. 9 of the accompanying drawings, the anode electrode 2 and the cathode electrode 3 comprise respective gas diffusion layers 6a, 6b and respective electrode catalyst layers 7a, 7b coated uniformly on respective surfaces of the gas diffusion layers 6a, 6b. Generally, the gas diffusion layers 6a, 6b are made of carbon paper, carbon cloth, or the like, and the electrode catalyst layers 7a, 7b are made of a carbon black with a catalyst of Pt carried on its particle surface, or the like.

As shown in FIG. 8, the electrolyte electrode assembly 5 is interposed between two separators 8a, 8b. The unit cell 1 also has collector electrodes 9a, 9b held against respective outer surfaces of the separators 8a, 8b, and end plates 10a, 10b held against respective outer surfaces of the collector electrodes 9a, 9b. The end plates 10a, 10b are connected to each other by bolts (not shown), sandwiching the electrolyte electrode assembly 5, the separators 8a, 8b, and the collector electrodes 9a, 9b between the end plates 10a, 10b. The separators 8a, 8b have respective gas passages 11a, 11b defined therein for supplying a hydrogen-containing gas and an oxygen-containing gas to the anode electrode 2 and the cathode electrode 3.

The anode electrode 2, the cathode electrode 3, and the electrolyte 4 are accommodated respectively in frame-shaped seals 12, 13, 14.

The general phosphoric acid fuel cell comprises a stack (not shown) of unit cells 1 that are electrically connected in series, a mechanism for supplying a hydrogen-containing gas to and discharging a hydrogen-containing gas from the stack, and a mechanism for supplying an oxygen-containing gas to and discharging an oxygen-containing gas from the stack.

For operating the phosphoric acid fuel cell, a fuel gas such as a hydrogen-containing gas or the like is supplied via the gas passages 11a in the separator 8a to the anode electrode 2 of each unit cell 1, whereas an oxygen-containing gas such as air or the like is supplied via the gas passages 11b in the separator 8b to the cathode electrode 3. The fuel gas and the oxygen-containing gas pass through the respective gas diffusion layers 6a, 6b of the electrodes 2, 3 and then reach the respective electrode catalyst layers 7a, 7b. In the electrode catalyst layer 7a of the anode electrode 2, the hydrogen in the fuel gas causes a reaction represented by the following formula (A), generating hydrogen ions and electrons:

$$2H_2 \rightarrow 4H^+ + 4e \quad (A)$$

The generated hydrogen ions move through the electrolyte 4 to the cathode electrode 3. During this time, the electrons flow to an external circuit that is electrically connected to the anode electrode 2 and the cathode electrode 3, are used as an electric energy in the form of a direct current to energize the external circuit, and then flow to the cathode electrode 3.

The hydrogen ions that have moved to the cathode electrode 3 and the electrons that have moved to the cathode electrode 3 via the external circuit react with the oxygen contained in the oxygen-containing gas supplied to the cathode electrode 3, as indicated by the following formula (B):

$$O_2 + 4H^+ + 4e \rightarrow 2H_2O \quad (B)$$

The fuel gas which remains unreacted is discharged out of the unit cell 1 (fuel cell) through the gas passages 11a in the separator 8a. Similarly, the oxygen-containing gas which remains unreacted and the generated $H_2O$ are discharged out of the unit cell 1 through the gas passages 11b in the separator 8b.

If the voltage across the unit cell 1 is represented by V, the density of the current generated by the unit cell 1 by I, and the effective area of the electrodes 2, 3 by S, then the output P of the unit cell 1 is determined according to the following equation (C):

$$P = I \times V \times S \quad (C)$$

In the fuel cell, as the current density I increases, the cell voltage V drops, and finally the output P of the unit cell 1 drops, as can be seen from the equation (C). Specifically, when the fuel cell generates electricity at a large current density, the voltage across the fuel cell drops below a desired level, failing to sufficiently energize the load connected to the fuel cell. For this reason, there has been a demand for a unit cell whose voltage drop is lower even when it generates electricity at a large current density, i.e., whose output is large at a large current density.

While the cell voltage V across the unit cell 1 varies depending on the current density I, the cell voltage V is generally about 1 V. If a higher cell output is needed to provide a power supply for a motor on an automobile, for example, then it is necessary to connect a number of unit cells 1 in series. However, the resulting fuel cell increases in weight and size, requiring a large installation space on the automobile. The automobile with the fuel cell carried thereon also becomes heavy. To avoid these shortcomings, there has been a demand for a unit cell with a higher output.

An approach to prevent the output P from dropping when the current density I is higher would be to lower the internal resistance of the fuel cell (unit cell 1) to increase the cell voltage V. The internal resistance of the unit cell 1 may be reduced by increasing the amount of the catalyst (Pt) carried by the carbon black of the electrode catalyst layers 7a, 7b.

However, since Pt is generally expensive, increasing the amount of Pt used in the electrode catalyst layers 7a, 7b would make the fuel cell expensive. Stated otherwise, it is difficult to increase the output of the fuel cell without making the fuel cell expensive.

One solution would be to use a cheaper catalyst. However, any cheaper catalyst capable of accelerating the reactions represented by the above formulas (A), (B) is not yet known in the art.

SUMMARY OF THE INVENTION

It is therefore an object of the present invention to provide a fuel cell which has electrode catalyst layers containing an inexpensive catalyst capable of lowering the internal resistance of the fuel cell, can be manufactured at a reduced cost, and is capable of producing a high output at a large current density.

To achieve the above object, there is provided in accordance with the present invention a fuel cell comprising a unit cell comprising an electrolyte electrode assembly having an anode electrode, a cathode electrode, and an electrolyte of a basic polymer impregnated with an electrolytic solution serving as a hydrogen ion conductor, and a pair of separators sandwiching the electrolyte electrode assembly therebetween, the anode electrode and the cathode electrode having respective gas diffusion layers and respective electrode catalyst layers, the electrode catalyst layer of at least the cathode electrode containing a Pt—Mn-based alloy having constituent elements of Pt and Mn.

The Pt—Mn-based alloy has substantially the same electric conductivity as Pt, and is less costly than Pt on an equal amount basis because it contains inexpensive Mn as a constituent element. That is, the amount of Pt—Mn-based alloy is greater than the amount of Pt at the same price. Therefore, the fuel cell can use a greater amount of catalyst at the same cost. Since the amount of catalyst can be increased by using a Pt—Mn-based alloy instead of Pt, the electrode catalyst layer of a higher electric conductivity is constructed at the same cost. As a result, the internal resistance of the fuel cell is reduced, allowing the fuel cell to produce a high output when it generates electricity at a large current density.

The rate of the chemical reaction represented by the formula (B) is lower than the rate of the chemical reaction represented by the formula (A). In the fuel cell, therefore, the chemical reaction represented by the formula (B) is a rate-controlling step. The electrode catalyst layer containing the Pt—Mn-based alloy as a catalyst is preferably disposed on the cathode electrode. While the catalyst in the electrode catalyst layer of the anode electrode may comprise a Pt—Mn-based alloy, the difference between the rates of the chemical reactions represented by the formulas (A), (B) in such an arrangement should preferably be reduced by making the amount of Pt—Mn-based alloy in the electrode catalyst layer of the cathode electrode greater than the amount of Pt—Mn-based alloy in the electrode catalyst layer of the anode electrode.

A preferable example of the Pt—Mn-based alloy is a Pt—Mn alloy because the Pt—Mn alloy can be prepared with utmost ease and can greatly reduce the internal resistance of the fuel cell.

The composition ratio of Pt and Mn in the Pt—Mn alloy is preferably Pt:Mn=1:99 through 91:9 in terms of a weight ratio. If Pt is less than 1 weight % and Mn exceeds 99 weight %, then the Pt—Mn alloy is not effective enough to lower the internal resistance of the fuel cell. If Pt exceeds 91 weight % and Mn is less than 9 weight %, then since the amount of Pt is large, it is difficult to reduce the cost of the fuel cell 20.

The basic polymer of the electrolyte preferably has a monomer of secondary amine as a structural unit. Since the basic polymer and an acid liquid electrolyte are strongly attracted to each other, the basic polymer has an excellent ability to retain the liquid electrolyte. Since the basic polymer has high mechanical strength, it makes an electrolyte layer which is less liable to be damaged. Furthermore, the basic polymer has a low gas permeability, it is highly effective to prevent hydrogen in a hydrogen-containing gas from being diffused into the cathode electrode before it is electrolytically dissociated. Thus, since the reaction efficiency of the chemical reaction represented by the formula (A) is increased, the energy conversion efficiency of the fuel cell is increased. One material which is particularly preferable as the basic polymer is polybenzimidazole because it has excellent properties as described above.

For operating the fuel cell, a pressure at the cathode electrode should be higher than a pressure at the anode electrode for accelerating the chemical reaction represented by the formula (B). Because the energy conversion efficiency of the fuel cell can thus be further increased, the fuel cell can generate electricity for a higher output.

Preferably, the ratio of an absolute pressure at the cathode electrode to an absolute pressure at the anode electrode is at most 2. This ratio range is reliably effective to prevent the electrolyte layer from being damaged and also prevent the liquid electrolyte from leaking out of the matrix.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 8:
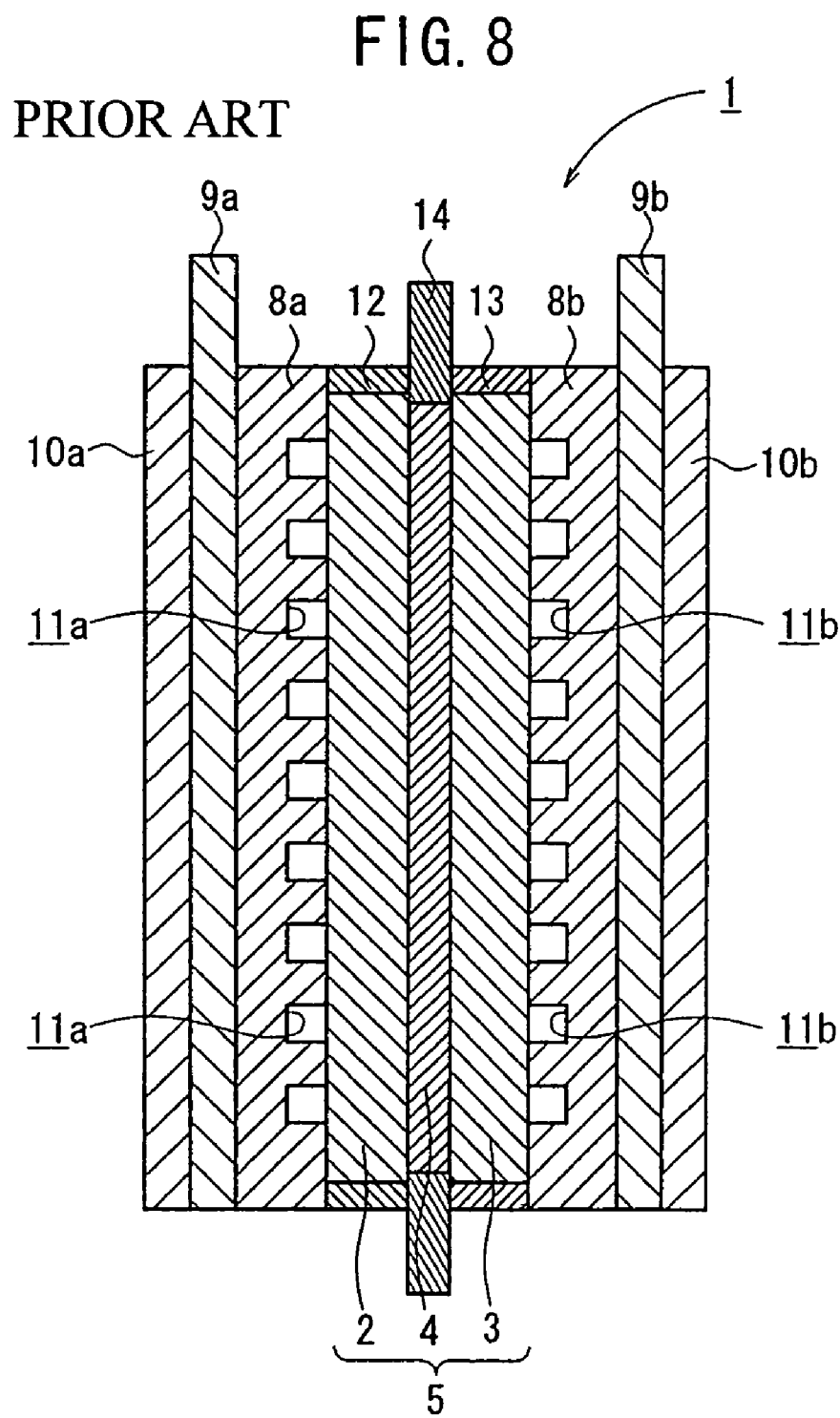
FIG. 8 is a vertical cross-sectional view of a unit cell of a conventional fuel cell.
Figure 9:
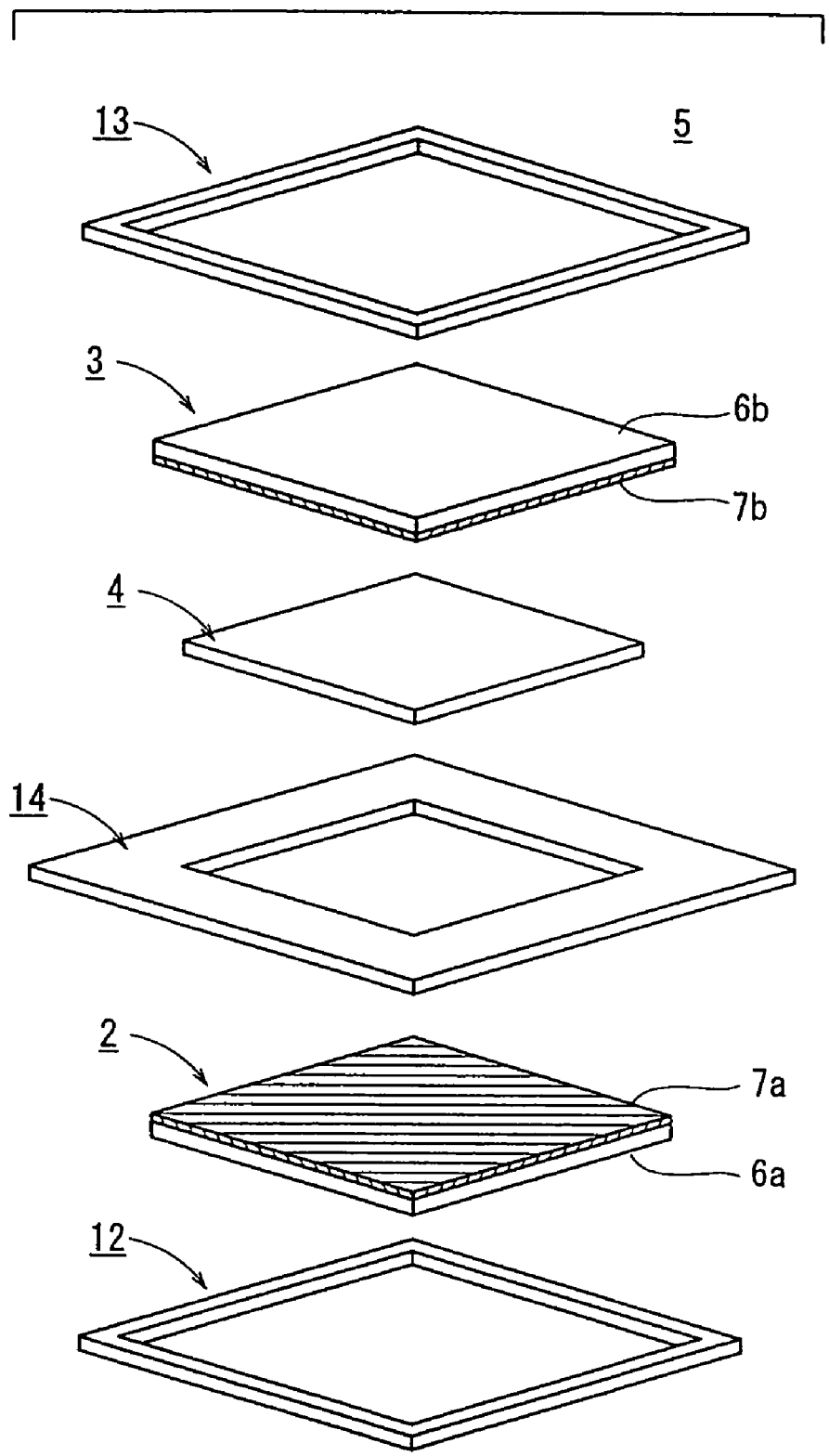
FIG. 9 is an exploded perspective view of an electrolyte electrode assembly of the fuel cell shown in FIG. 8.

Fuel cells according to preferred embodiments of the present invention will be described in detail below with reference to the accompanying drawings. Those parts of the fuel cells according to the preferred embodiments which are identical to those of the fuel cell shown in FIGS. 8 and 9 are denoted by identical reference characters, and will not be described in detail below.

Figure 1:
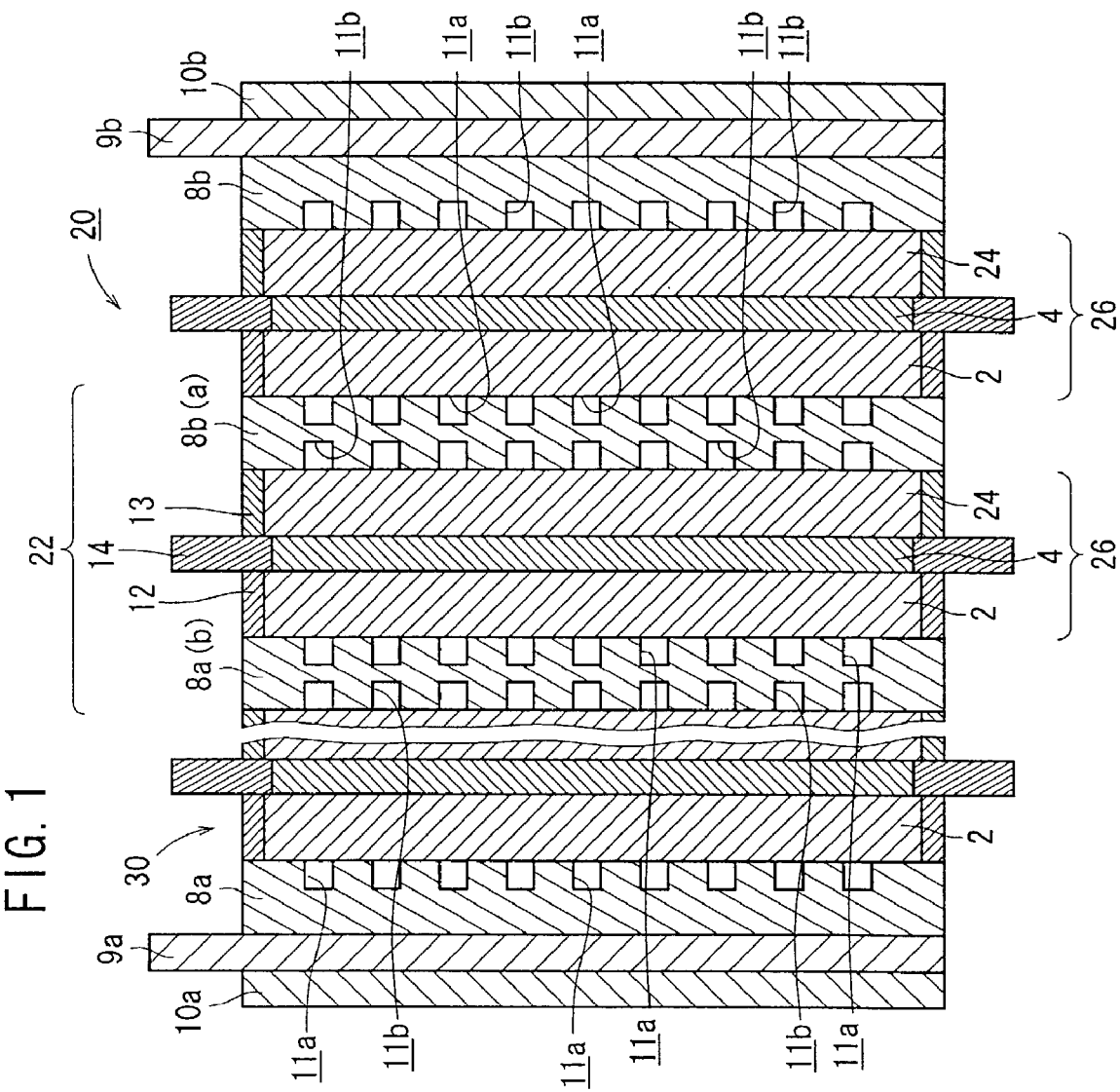
FIG. 1 is a vertical cross-sectional view of a fuel cell according to the present invention.

A fuel cell according to the present invention is illustrated in vertical cross section in FIG. 1. The fuel cell, denoted at 20, has a plurality of unit cells 22 that are assembled together. Each of the unit cells 22 has an electrolyte electrode assembly 26 comprising an anode electrode 2, a cathode electrode 24, and an electrolyte 4 interposed between the anode electrode 2 and the cathode electrode 24. The anode electrode 2, the cathode electrode 24, and the electrolyte 4 are joined together.

Figure 2:
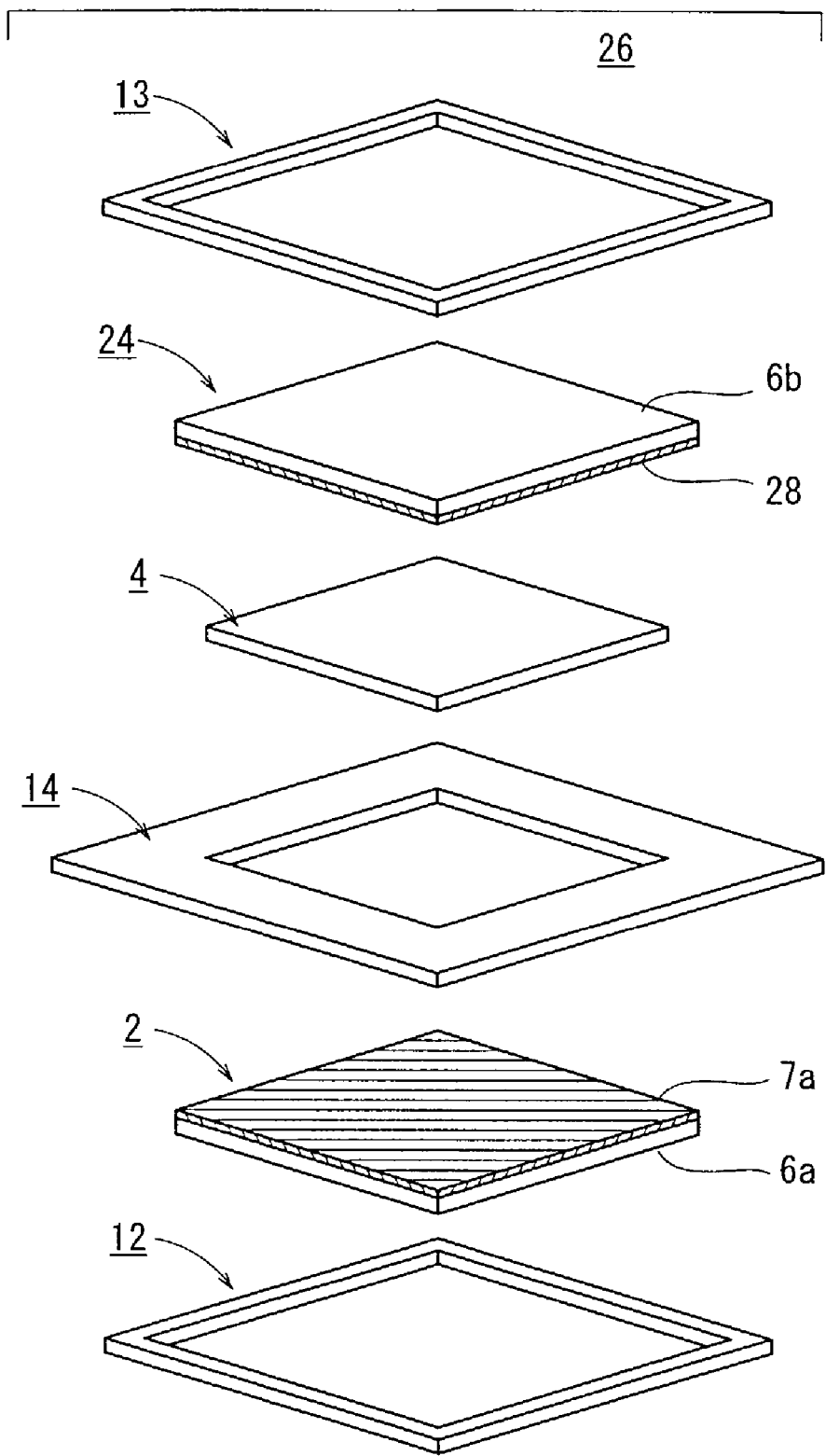
FIG. 2 is an exploded perspective view of an electrolyte electrode assembly of the fuel cell shown in FIG. 1.

As shown in FIG. 2, the anode electrode 2 and the cathode electrode 24 comprise respective gas diffusion layers 6a, 6b and respective electrode catalyst layers 7a, 28 coated uniformly on respective surfaces of the gas diffusion layers 6a, 6b. The gas diffusion layers 6a, 6b are made of carbon paper, and the electrode catalyst layer 7a is made of a carbon black with a catalyst of Pt carried on its particle surface. The electrode catalyst layer 28 is made of a carbon black with a catalyst of a Pt—Mn-based alloy carried on its particle surface.

A Pt—Mn-based alloy has an electric conductivity which is substantially the same as the electric conductivity of Pt. Since a Pt—Mn-based alloy contains inexpensive Mn as a constituent element, it is cheaper than Pt on an equal amount basis. Stated otherwise, a Pt—Mn-based alloy is available in a greater amount than Pt if they are of the same cost. Therefore, since a greater amount of catalyst can be used at the same cost, the electrode catalyst layer 28 has a higher electric conductivity at the same cost. Consequently, the internal resistance of the fuel cell 20 can be reduced, and hence the fuel cell 20 can produce a higher output when it generates electricity at a high current density.

The Pt—Mn-based alloy may be any of various alloys insofar as it contains a metal element cheaper than Pt and has an electric conductivity that is substantially the same as Pt. However, the Pt—Mn-based alloy should preferably be a Pt—Mn alloy as it can be prepared with ease and it can greatly reduce the internal resistance of the fuel cell 20.

If a Pt—Mn alloy is employed as the Pt—Mn-based alloy, then the composition ratio of Pt and Mn in the Pt—Mn alloy should preferably be in the range of Pt:Mn=1:99 through 91:9. If Pt is less than 1 weight % and Mn exceeds 99 weight %, then the Pt—Mn alloy is not effective enough to lower the internal resistance of the fuel cell 20. If Pt exceeds 91 weight % and Mn is less than 9 weight %, then since the amount of Pt is large, it is difficult to reduce the cost of the fuel cell 20. If another Pt—Mn-based alloy is employed, then the composition ratio of Pt and Mn may be selected in view of the reduction which the Pt—Mn-based alloy can achieve in the internal resistance of the fuel cell 20 and the cost thereof.

The cathode electrode 24 having the electrode catalyst layer 28 containing the Pt—Mn-based alloy may be fabricated as follows:

First, a Mn salt such as $Mn(CH_3COO)_2$ (manganese acetate), $MnCl_2$ (manganese chloride), $Mn(NO_3)_2$ (manganese nitrate), or the like is mixed with a carbon black with Pt carried on its particle surface, producing a mixture. The mixture is heated to reduce the Mn salt to Mn, which is joined to Pt to produce a Pt—Mn alloy. At this stage, a carbon black with a Pt—Mn alloy carried on its particle surface is obtained. If a ternary or multicomponent Pt—Mn-based alloy with one or more additional metal elements being further joined is used, then a salt or salts containing such metal elements may be added.

A porous carbon material which carries the Pt—Mn alloy is dispersed into a solvent such as ethylene glycol or the like, producing a dispersion. The dispersion is then coated on a face of a sheet of carbon paper by a known technique such as a screen printing process. Then, the coated sheet of carbon paper is dried to volatilize away, producing the cathode electrode 24 which comprises the gas diffusion layer 6a of carbon paper and the electrode catalyst layer 28 disposed on the gas diffusion layer 6a and made of the carbon black which carries the Pt—Mn alloy.

In the electrolyte electrode assembly 26, the electrolyte 4 interposed between the electrodes 2, 24 comprises a basic polymer impregnated with an electrolytic solution. The basic polymer may be any of various polymers insofar as it can be impregnated with a liquid electrolyte such as phosphoric acid, sulfuric acid, methylsulfonic acid, or the like which functions as a hydrogen ion conductor. However, the basic polymer should preferably be a polymer having a monomer of secondary amine as a structural unit because it has an excellent ability to retain a liquid electrolyte, a low gas permeability, and is highly strong. Examples of the basic polymer are represented by the following formulas (1) through (4):

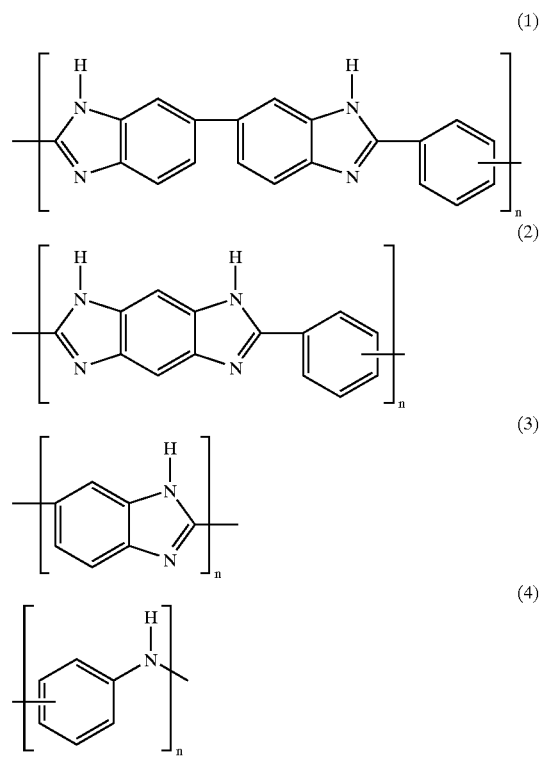

In particular, the polybenzimidazole represented by the formula (1) is preferable because it has an excellent ability to retain a liquid electrolyte, a low gas permeability, and is highly strong. The electrolyte 4 can be prepared by dipping the basic polymer in the liquid electrolyte, thereby impregnating the basic polymer with the liquid electrolyte.

The electrolyte 4 is sandwiched between the anode electrode 2 and the cathode electrode 24. The assembly is then pressurized and heated to join the electrodes 2, 24 to the electrolyte 4, thus producing the electrolyte electrode assembly 26.

The electrolyte electrode assembly 26 is then interposed between two separators 8a, 8b, producing the unit cell 22. A predetermined number of unit cells 22 are then stacked and electrically connected in series, providing a stacked assembly 30 (see FIG. 1). Collector electrodes 9a, 9b are electrically connected respectively to the separator 8a held against the anode electrode 2 of the unit cell 22 on one end of the stacked assembly 30 and the separator 8b held against the cathode electrode 24 of the unit cell 22 on the other end of the stacked assembly 30. Then, end plates 10a, 10b are attached respectively to the collector electrodes 9a, 9b, thereby completing the fuel cell 20. The end plates 10a, 10b are connected to each other by bolts (not shown).

The separators 8a, 8b have respective gas passages 11a, 11b defined therein for supplying a hydrogen-containing gas and an oxygen-containing gas to the anode electrode 2 and the cathode electrode 24, and also discharging an unreacted gas out of the fuel cell 20.

The anode electrode 2, the cathode electrode 24, and the electrolyte 4 are accommodated respectively in frame-shaped seals 12, 13, 14.

The fuel cell 20 is of the basic construction as described above. Operation and advantages of the fuel cell 20 will be described below.

Figure 3:
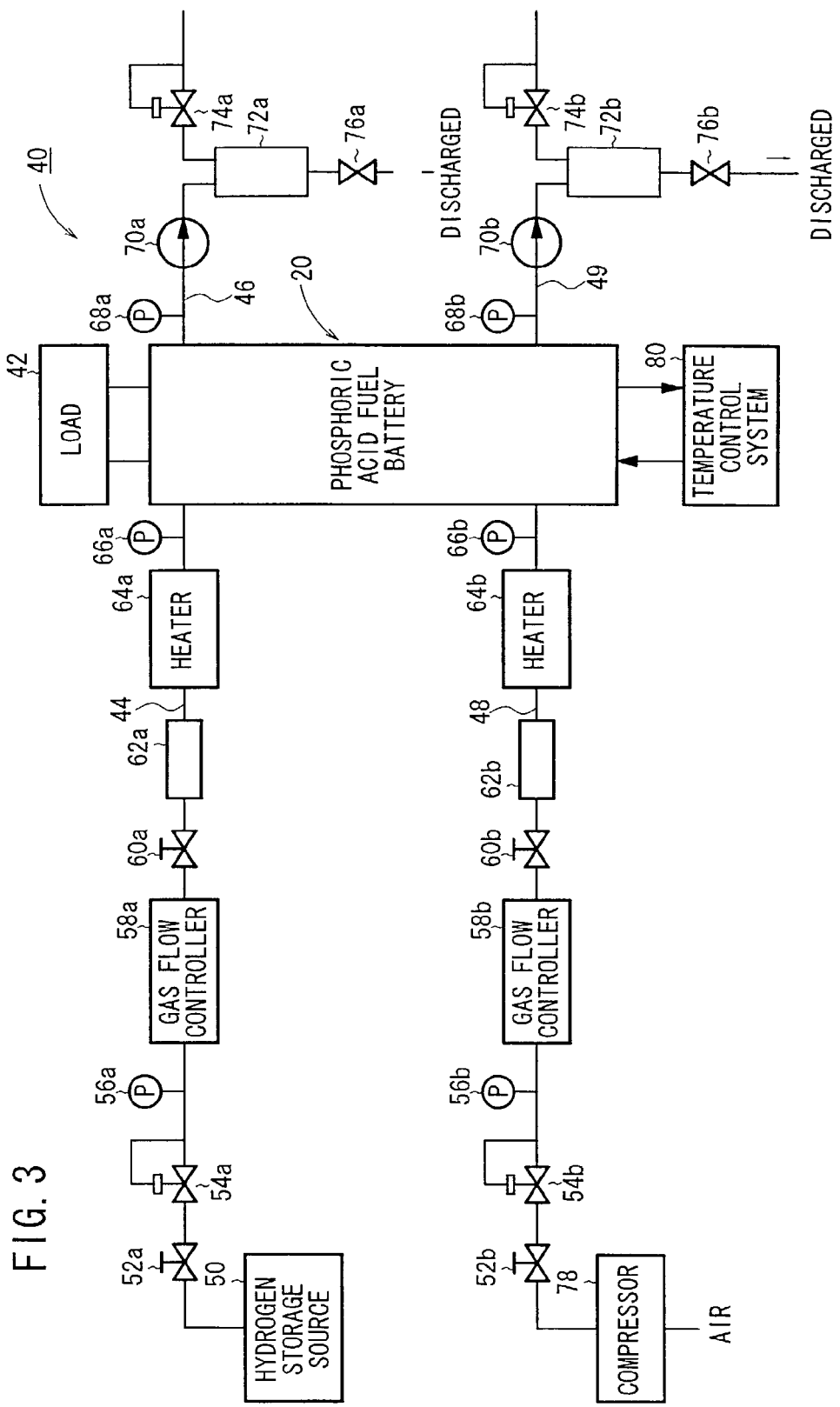
FIG. 3 is a block diagram of a fuel cell system which incorporates the fuel cell shown in FIG. 1 and peripheral devices.

A fuel cell system 40 which incorporates the fuel cell 20 is shown in block form in FIG. 3. A load 42 such as a motor or the like is electrically connected to the collector electrodes 9a, 9b (see FIG. 1) of the fuel cell 20. To the fuel cell 20, there are connected a hydrogen-containing gas supply passage 44 (see FIG. 3) and a hydrogen-containing gas discharge passage 46 which are held in communication with the gas passages 11a in each of the unit cells 22 of the stacked assembly 30, and an oxygen-containing gas supply passage 48 and an oxygen-containing gas discharge passage 49 which are held in communication with the gas passages 11b in each of the unit cells 22 of the stacked assembly 30.

To the hydrogen-containing gas supply passage 44, there are connected a hydrogen storage source 50 for supplying the hydrogen-containing gas under a high pressure, a solenoid-operated valve 52a, a pressure reducing valve 54a, a pressure sensor 56a, a gas flow controller 58a, a shutoff valve 60a, a check valve 62a, a heater 64a, and an inlet pressure sensor 66a successively in the order named in a direction toward an inlet of the fuel cell 20. To the hydrogen-containing gas discharge passage 46, there are connected an outlet pressure sensor 68a, a heat exchanger 70a, a gas-liquid separator 72a, and a back pressure valve 74a successively in the order named in a direction away from an outlet of the fuel cell 20. A solenoid-operated valve 76a is connected to an outlet of the gas-liquid separator 72a.

The oxygen-containing gas supply passage 48 and the oxygen-containing gas discharge passage 49 are of a structure identical to the hydrogen-containing gas supply passage 44 and the hydrogen-containing gas discharge passage 46. Those parts connected to the oxygen-containing gas supply passage 48 and the oxygen-containing gas discharge passage 49 which are identical to those connected to the hydrogen-containing gas supply passage 44 and the hydrogen-containing gas discharge passage 46 are denoted by identical reference numerals with a suffix "b", and will not be described in detail below. A compressor 78 for supplying air as the oxygen-containing gas is connected to an upstream end of the oxygen-containing gas supply passage 48.

The operating temperature of the fuel cell 20 in the fuel cell system 40 is controlled by a temperature control system 80.

The fuel cell system 40 operates as follows:

The hydrogen storage source 50 supplies the hydrogen-containing gas under a high pressure to the hydrogen-containing gas supply passage 44. The hydrogen-containing gas is then adjusted to a given pressure, a given rate, and a given temperature while flowing through the pressure-reducing valve 54a, the gas flow controller 58a, and the heater 64a. Thereafter, the hydrogen-containing gas is supplied via the gas passages 11a in the separator 8a in each unit cell 22 (see FIG. 1) of the fuel cell 20 to the gas diffusion layer 6a (see FIG. 2) of the anode electrode 2 in each unit cell 22, from which the hydrogen-containing gas reaches the electrode catalyst layer 7a.

The compressor 78 supplies the oxygen-containing gas such as air to the oxygen-containing gas supply passage 48 (see FIG. 3). The oxygen-containing gas is then adjusted to a given pressure, a given rate, and a given temperature while flowing through the pressure-reducing valve 54b, the gas flow controller 58b, and the heater 64b. Thereafter, the oxygen-containing gas is supplied via the gas passages 11b in the separator 8b in each unit cell 22 (see FIG. 1) of the fuel cell 20 to the gas diffusion layer 6b (see FIG. 2) of the cathode electrode 24 in each unit cell 22, from which the hydrogen-containing gas reaches the electrode catalyst layer 28.

The hydrogen-containing gas or the oxygen-containing gas which has passed through the gas passages 11a, 11b without being supplied to the anode electrode 2 (see FIG. 1) or the cathode electrode 24 flows from the heat exchanger 70a, 70b to the gas-liquid separator 72a, 72b connected to the hydrogen-containing gas discharge passage 46 (see FIG. 3) or the oxygen-containing gas discharge passage 49. The gas-liquid separator 72a, 72b separates the supplied gas into a gas component and a liquid component.

For operating the fuel cell system 40 which incorporates the fuel cell 20, the pressure at the cathode electrode 24 (see FIG. 1) can be made higher than the pressure at the anode electrode 2.

In the unit cells 22 of the fuel cell 20 (see FIG. 1), the basic polymer of the electrolyte 4 has high mechanical strength. Therefore, the electrolyte 4 is resistant to damage even when the differential pressure between the cathode electrode 24 and the anode electrode 2 is increased.

In the electrolyte 4, since the liquid electrolyte (phosphoric acid, sulfuric acid, methanesulfonic acid, or the like) which is acid and the basic polymer are strongly attracted to each other, the liquid electrolyte is unlikely to leak from the basic polymer.

The differential pressure between the cathode electrode 24 and the anode electrode 2 is set in order to prevent the electrolyte 4 from being damaged and to prevent the liquid electrolyte from leaking from the basic polymer. While the differential pressure varies dependent on the type of the basic polymer, it is preferable that the ratio of the absolute pressure at the cathode electrode 24 to the pressure at the anode electrode 2 fall within 2 in order to reliably prevent the electrolyte 4 from being damaged and to prevent the liquid electrolyte from leaking from the basic polymer.

The hydrogen-containing gas and the oxygen-containing gas which are supplied to the anode electrode 2 and the cathode electrode 24, respectively, are greatly inhibited from passing through the electrolyte 4 because the gas permeability of the basic polymer of the electrolyte 4 is low. Therefore, the hydrogen in the hydrogen-containing gas is prevented from directly reacting with the oxygen in the oxygen-containing gas, so that the energy conversion efficiency of the fuel cell 20 (see FIG. 1) in the fuel cell system 40 (see FIG. 3) is increased.

Specifically, the hydrogen is electrolytically dissociated highly efficiently by the electrode catalyst layer 7a (see FIG. 2) of the anode electrode 2 as indicated by the formula (A), generating a large amount of hydrogen ions and electrons. The electrons provide an electric energy for energizing the load 42 such as a motor which is electrically connected to the fuel cell system 40 (see FIG. 3).

The hydrogen ions pass through the electrolyte 4 (see FIGS. 2 and 4) to the electrode catalyst layer 28 (see FIG. 2) of the cathode electrode 24. In the electrode catalyst layer 28, the hydrogen ions, the electrons that have reached the cathode electrode 24 through the load 42, and the oxygen in the oxygen-containing gas that has been supplied to the cathode electrode 24 and has passed through the gas diffusion layer 6b of the cathode electrode 24 cause the chemical reaction represented by the formula (B), generating $H_2O$.

The electrode catalyst layer 28 of the cathode electrode 24 contains a large amount of Pt—Mn-based alloy serving as a catalyst. Therefore, the chemical reaction represented by the formula (B) is accelerated and develops at an increased rate. Since the chemical reaction represented by the formula (B) is a rate-controlling step in all the cell reaction steps of the fuel cell 20, when the rate of the chemical reaction represented by the formula (B) is increased, the energy conversion efficiency of the fuel cell 20 is highly increased.

As a result, the internal resistance of the unit cell 22 and hence the fuel cell 20 is lowered. The drop of the cell voltage V can thus be reduced even when the unit cell 22 generates electricity at a large current density, and the output P indicated by the formula (C) can be increased. Stated otherwise, the fuel cell 20 can produce a high output even if the number of unit cells 22 thereof is small. Therefore, the fuel cell 20 can be reduced in size and weight, and yet can energize the load sufficiently. The fuel cell 20 can be mounted in a reduced installation space on an automobile, and the weight of the automobile on which the fuel cell 20 is mounted is not increased.

Furthermore, the fuel cell system 40 operates with the pressure at the cathode electrode 24 being higher than the pressure at the anode electrode 2. Therefore, the oxygen exists in a greater proportion in the electrode catalyst layer 28 of the cathode electrode 24 than with a general operating process for operating the fuel cell 20 with the pressure at the anode electrode 2 being higher than the pressure at the cathode electrode 24. Thus, the chemical reaction represented by the formula (B) is accelerated to further increase the energy conversion efficiency of the fuel cell 20. Consequently, the output P of the unit cell 22 can be increased by operating the unit cell 2 in this manner. The fuel cell 20 can thus be further reduced in size and weight.

As described above, the output P of the unit cell 22 can be increased by operating the fuel cell system 40 with the pressure at the cathode electrode 24 being higher than the pressure at the anode electrode 2.

During operation, the temperature of the fuel cell 20 is kept at about 160° by the temperature control system 80. Therefore, the generated $H_2O$ is in a gas phase (water vapor). After the generated $H_2O$ is diffused in the gas diffusion layer 6b of the cathode electrode 24, it is quickly discharged together with the unreacted oxygen-containing gas through the gas passage 11b of the separator 8b into the oxygen-containing gas discharge passage 49. The liquid electrolyte of the electrolyte 4 is thus prevented from being discharged together with the generated $H_2O$.

In the above embodiment, the Pt—Mn-based alloy is contained in only the electrode catalyst layer 28 of the cathode electrode 24. However, the electrode catalyst layer 28 containing the Pt—Mn-based alloy may be employed in place of the electrode catalyst layer 7a of the anode electrode 2. According to this modification, the amount of the Pt—Mn-based alloy in the electrode catalyst layer 28 of the cathode electrode 24 may be made greater than the amount of the Pt—Mn-based alloy in the anode electrode 2 to reduce the difference between the reaction rates of the formulas (A), (B).

In the present embodiment, a number of unit cells 22 are stacked into the fuel cell 20. However, a single unit cell 22 may make up the fuel cell.

EXAMPLES

(1) Production of Fuel Cells 20

Vulcan XC72 (tradename, manufactured by Cabot Inc.) was selected as carbon black, a Pt powder was carried on the particle surface of the Vulcan XC72 at a ratio of 40 weight %, thus providing Pt-carrying Vulcan XC72 (hereinafter referred to as Pt-carrying CB).

The Pt-carrying CB was dispersed in ethylene glycol to provide a dispersion, which was then coated on a piece of carbon cloth having a length of 60 mm, a width of 60 mm, and a thickness of 270 $\mu$m according to a screen printing process. The coated piece of carbon cloth was dried at 120° C. for 20 minutes to volatilize away the ethylene glycol, producing an anode electrode 2 with the Pt dispersed thereon at a ratio of 0.5 mg per 1 $cm^2$ of carbon cloth. Specifically, the anode electrode 2 comprises a gas diffusion layer 6a made of carbon cloth and an electrode catalyst layer 7a disposed on the gas diffusion layer 6a and made of Pt-carrying CB.

Acetylene Black AB-5 (tradename, manufactured by Denki Kagaku Kogyo K. K.) was selected as carbon black, and a Pt powder was carried on the particle surface of the Acetylene Black AB-5 at a ratio of 40 weight %. Manganese acetate was added to the Acetylene Black AB-5 such that the atomic ratio of Pt and Mn was 1:1 (weight ratio of 78:22), providing a mixture. The mixture was then heated in a reducing gas atmosphere, thus preparing a Pt—Mn alloy. Stated otherwise, Acetylene Black AB-5 carrying a Pt—Mn alloy (hereinafter referred to as PM carrying AB) was produced.

The PM carrying AB was dispersed in ethylene glycol to provide a dispersion, which was then coated on a piece of carbon cloth having a length of 60 mm, a width of 60 mm, and a thickness of 270 $\mu$m according to a screen printing process. The coated piece of carbon cloth was dried at 120° C. for 20 minutes to volatilize away the ethylene glycol, producing a cathode electrode 24 with the Pt—Mn alloy dispersed thereon at a ratio of 1 mg (0.78 mg of Pt) per 1 $cm^2$ of carbon cloth. Specifically, the cathode electrode 24 comprises a gas diffusion layer 6b made of carbon cloth and an electrode catalyst layer 28 disposed on the gas diffusion layer 6b and made of PM-carrying AB.

A membrane of polybenzimidazole (basic polymer) having a vertical dimension of 60 mm, a horizontal dimension of 60 mm, and a thickness of 50 $\mu$m was weighed, and then dipped in a phosphoric acid solution having a concentration of 85% for 24 hours or more to cause the concentration of the phosphoric acid in the membrane to reach equilibrium, producing an electrolyte 4 where the membrane was impregnated with the phosphoric acid. The electrolyte 4 was dried in vacuum at 80° C., and weighed again. The weight of the electrolyte 4 and the weight of the membrane before it was dipped in the phosphoric acid solution were compared with each other, thus calculating the number of moles of the phosphoric acid in the electrolyte 4. The number of molecules of the phosphoric acid per structural unit of polybenzimidazole, as calculated from the number of moles, was 10.2.

Figure 4:
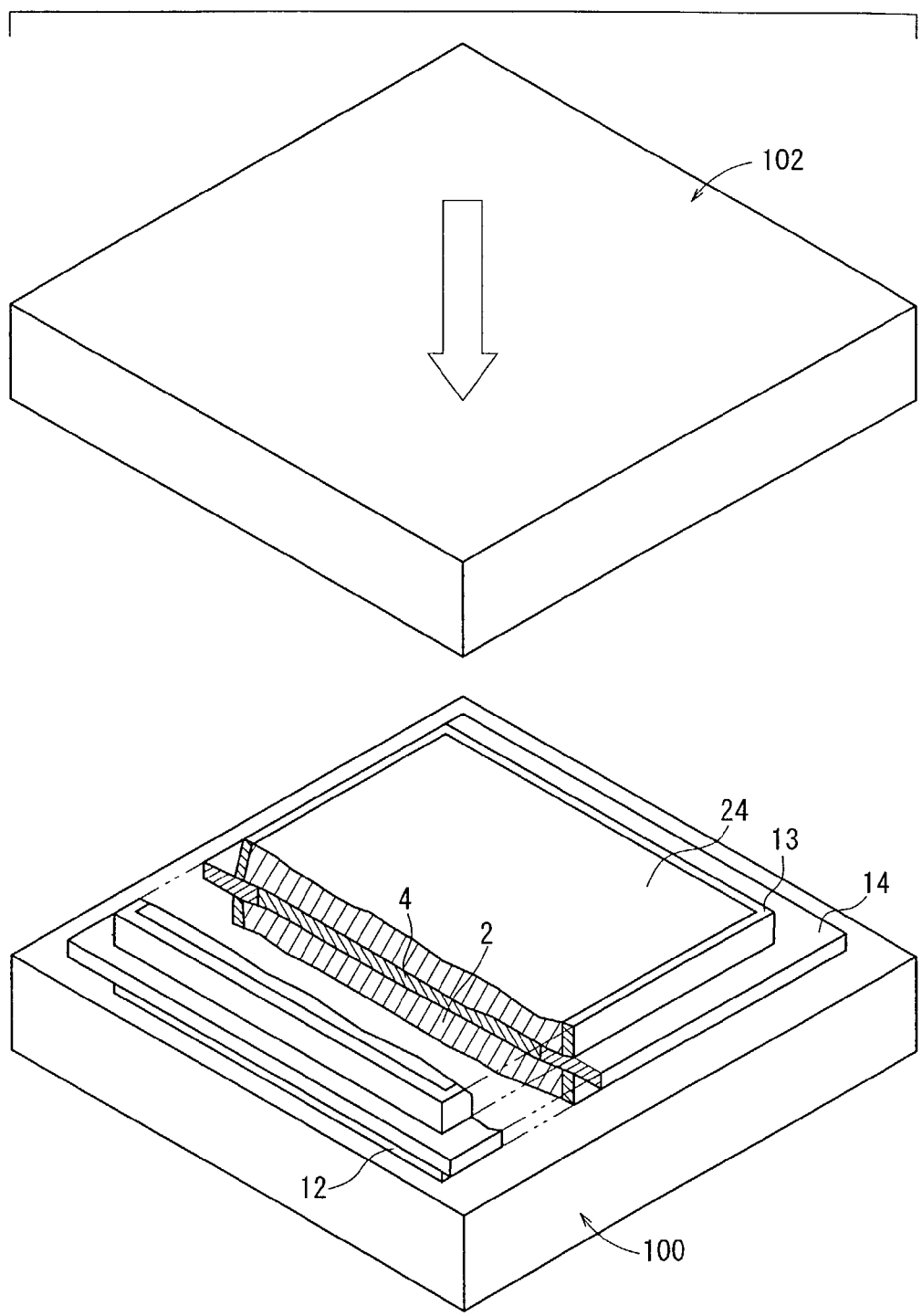
FIG. 4 is a perspective view, partly cut away, showing the manner in which the electrolyte electrode assembly shown in FIG. 2 is fabricated.

The anode electrode 2, the electrolyte 4, and the cathode electrode 24 were placed respectively in the seals 12, 14, 13, as shown in FIG. 4. Thereafter, the anode electrode 2 was placed on a lower press plate 100 of a press, not shown, such that the electrode catalyst layer 7a was positioned upwardly, and the electrolyte 4 and the cathode electrode 24 were placed in the order named on the anode electrode 2. The cathode electrode 24 was placed such that the electrode catalyst layer 28 was positioned downwardly.

The assembly was then pressed and heated between the lower press plate 100 and an upper press plate 102 under a pressure of 4 MPa at a temperature of 160° C. for 30 seconds. The anode electrode 2 and the cathode electrode 24 were integrally joined to the respective opposite surfaces of the electrolyte 4, producing an electrolyte electrode assembly 26 where the electrolyte 4 was accommodated in the seal 14 and the anode electrode 2 and the cathode electrode 24 were accommodated respectively in the seals 12, 13.

Then, separators 8a, 8b with gas passages 11a, 11b defined therein were placed against the respective opposite surfaces of the electrolyte electrode assembly 26. Collector electrodes 9a, 9b and end plates 10a, 10b are then placed against outer sides of the separators 8a, 8b, and the end plates 10a, 10b are coupled to each other by bolts, not shown, thus producing a fuel cell 20 which comprises a single unit cell 22.

The peripheral devices shown in FIG. 3 were combined with the fuel cell 20 thus produced, making up a fuel cell system 40. The fuel cell system 40 will be referred to as Inventive Example 1.

Other fuel cell systems 40 were constructed using cathode electrodes 24 which were produced in the same manner as with Inventive Example 1 except that the atomic ratios of Pt and Mn in the PM-carrying AB were 2:1, 3:1 (respective weight ratios of 88:12, 91:9). These fuel cell systems 40 will be referred to as Inventive Example 2 and Inventive Example 3, respectively.

Another fuel cell system 40 was constructed using a cathode electrode 24 which was produced in the same manner as with Inventive Example 2 except that the gas diffusion layer 6b was made of a piece of carbon paper having a length of 60 mm, a width of 60 mm, and a thickness of 270 μm. The fuel cell system 40 will be referred to as Inventive Example 4.

For comparison purposes, a cathode electrode 3 was produced which had an electrode catalytic layer 7b made of Acetylene Black AB-5 carrying Pt at a ratio of 40 weight %, and a fuel cell system was constructed using the cathode electrode 3 thus produced. The fuel cell system will be referred to as Comparative Example 1. In the electrode catalytic layer 7b according to Comparative Example 1, Pt was dispersed at a ratio of 1 mg per 1 $cm^2$ of carbon cloth.

Another fuel cell system was constructed using an anode electrode 2 and a cathode electrode 3 which were produced in the same manner as with Inventive Example 2 except that each of the gas diffusion layers 6a, 6b were made of a piece of carbon paper having a length of 60 mm, a width of 60 mm, and a thickness of 270 μm. The fuel cell system thus constructed will be referred to as Comparative Example 2.

In the electrode catalytic layers 7a, 7b according to Comparative Example 2, Pt was dispersed at respective ratios of 0.5 mg and 1.5 mg per 1 $cm^2$ of carbon cloth.

(2) Operation of the Fuel Cell Systems 40 According to Inventive Examples 1 through 3 and Comparative Example 1

The fuel cell systems 40 according to Inventive Examples 1 through 3 and Comparative Example 1 were supplied with hydrogen and air such that a gas utilization factor defined by multiplying, by 100, a value produced by dividing an amount of gas consumed in a reaction by an amount of gas supplied to the reaction was 67% on the anode electrode 2 and 50% on the cathode electrode 24, while the temperature of the fuel cells 20 was maintained at 160° C. by the temperature control system 80. At that time, the hydrogen was supplied to the anode electrode 2 under a pressure of 200 kPa (absolute pressure) and the air was supplied to the cathode electrodes 3, 24 under a pressure of 200 kPa. That is, the fuel cell systems 40 were operated at various current densities under equalized absolute pressures at the anode and cathode electrodes. The pressures under which the hydrogen and the air were supplied were determined from values measured by the inlet pressure sensors 66a, 66b.

Figure 5:
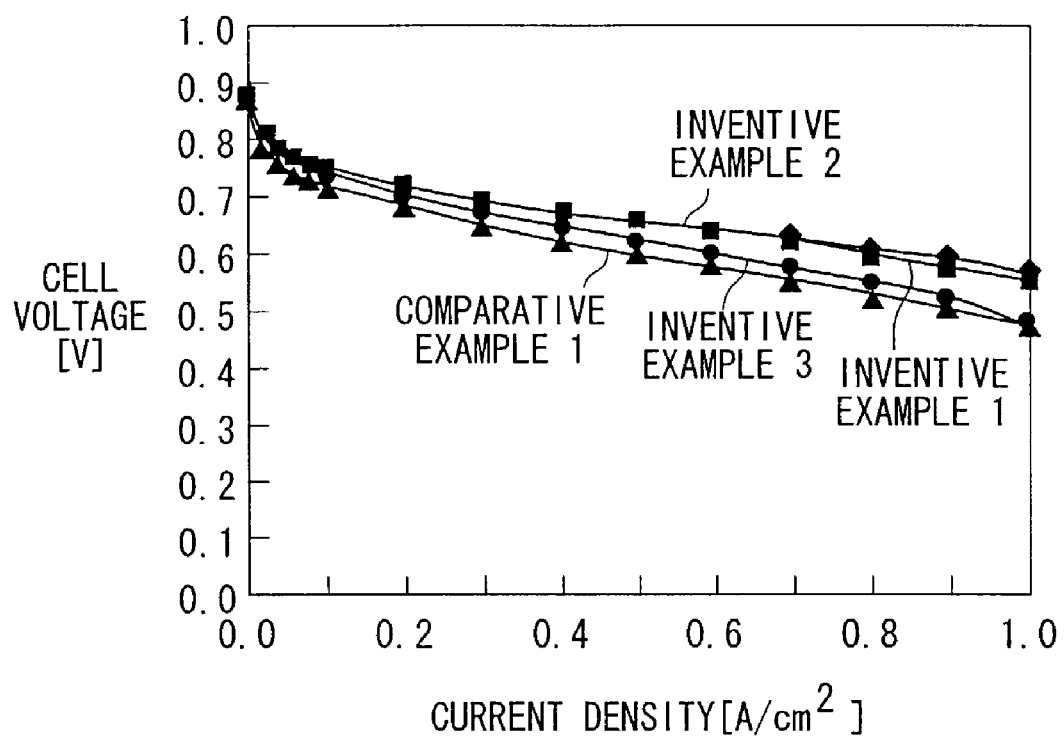
FIG. 5 is a graph showing the relationships between the current density and the cell voltage in fuel cell systems according to Inventive Examples 1 through 3 and Comparative Example 1.

The relationships between the current density I and the cell voltage V in the fuel cell systems according to Inventive Examples 1 through 3 and Comparative Example 1 are shown in FIG. 5. It can be seen from FIG. 5 that even when the current density is of a relatively large value of 1 $A/cm^2$, the cell voltage V in the fuel cell systems 40 according to Inventive Examples 1 through 3 is higher than the cell voltage V in the fuel cell system according to Comparative Example 1. The result shown in FIG. 5 indicates that the fuel cell systems 40 according to Inventive Examples 1 through 3 produces a higher output than the fuel cell system according to Comparative Example 1. The amount of the catalyst (Pt—Mn alloy) in the electrode catalyst layer 28 according to Inventive Examples 1 through 3 is the same as the catalyst (Pt) in the electrode catalyst layer 7b according to Comparative Example 1. Therefore, it is apparent that the fuel cell systems 40 according to Inventive Examples 1 through 3 is lower in cost but produces higher output than the fuel cell system according to Comparative Example 1.

Figure 6:
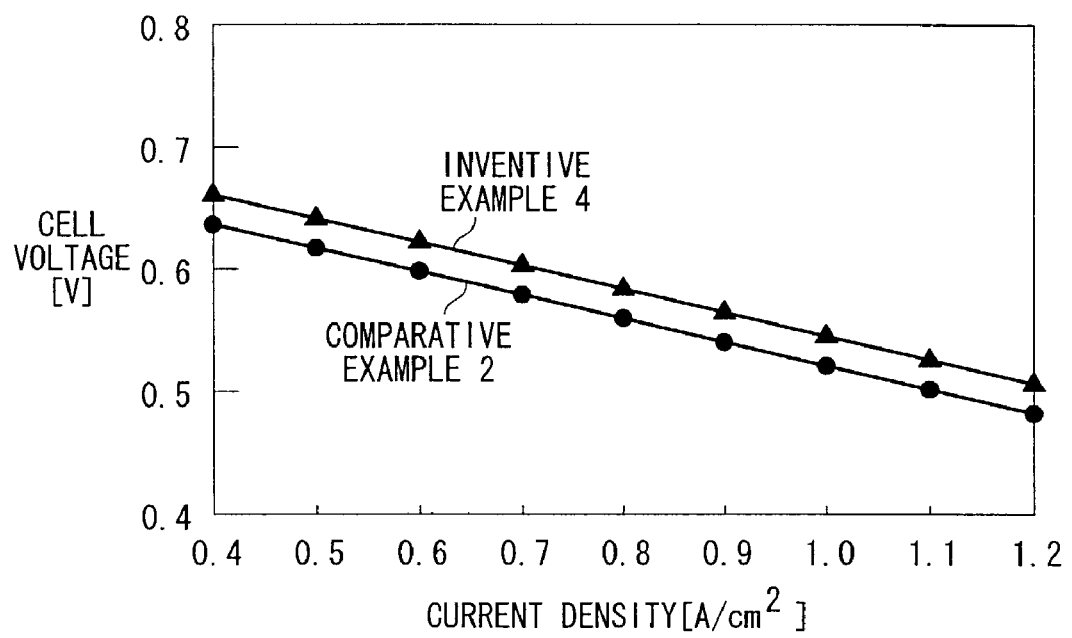
FIG. 6 is a graph showing the relationships between the current density and the cell voltage in fuel cell systems according to Inventive Example 4 and Comparative Example 2.

(3) Operation of the Fuel Cell Systems According to Inventive Example 4 and Comparative Example 2 with Gases Supplied under Different Pressures to the Electrodes The fuel cell systems according to Inventive Example 4 and Comparative Example 2 were operated in the same manner as described above with the hydrogen being supplied to the anode electrode 2 under a pressure of 200 kPa and the air being supplied to the cathode electrodes 3, 24 under a pressure of 200 kPa, i.e., the ratio of the absolute pressure at the cathode electrodes 3, 24 to the absolute pressure at the anode electrode 2 being 1. The relationships between the current density I and the cell voltage V in the fuel cell systems according to Inventive Example 4 and Comparative Example 2 is shown in FIG. 6. It can be seen from FIG. 6 that even when the current density is in a large range from 0.4 to 1.2 $A/cm^2$, the cell voltage V in the fuel cell system 40 according to Inventive Example 4 is higher than the cell voltage V in the fuel cell systems according to Comparative Example 2, or stated otherwise, the fuel cell system 40 according to Inventive Examples 1 through 3 produces a higher output than the fuel cell systems according to Comparative Example 2.

The fuel cell systems according to Inventive Example 4 and Comparative Example 2 were operated in the same manner as described above except that the hydrogen was supplied to the anode electrode 2 under a pressure of 200 kPa and the air was supplied to the cathode electrodes 3, 24 under a pressure of 300 kPa, i.e., the ratio of the absolute pressure at the cathode electrodes 3, 24 to the absolute pressure at the anode electrode 2 was 1.5.

Figure 7:
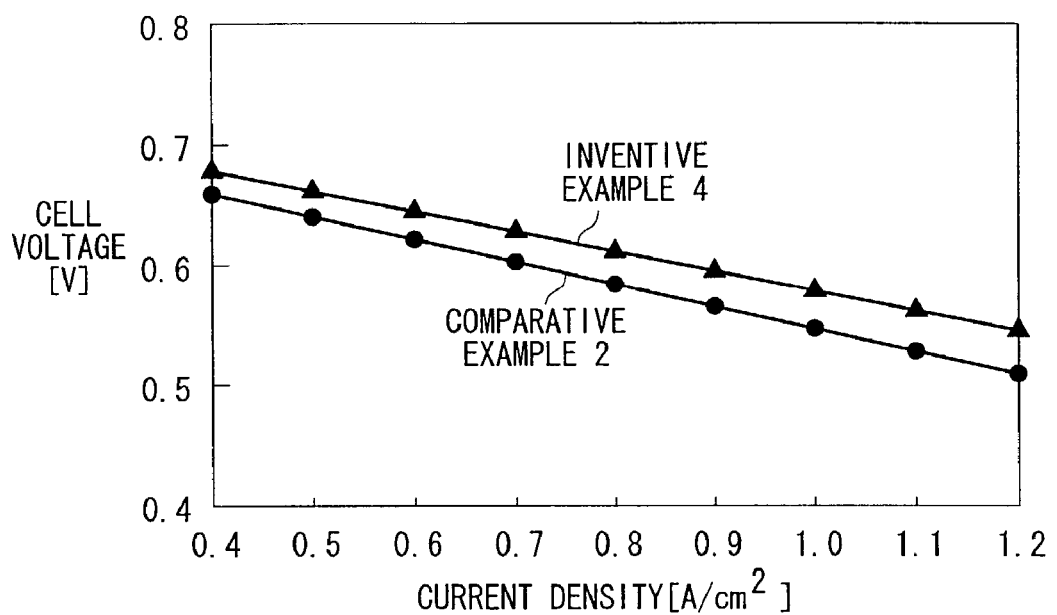
FIG. 7 is a graph showing the relationships between the current density and the cell voltage at the time each of fuel cell systems according to Inventive Example 4 and Comparative Example 2 when the ratio of a pressure supplied to a cathode electrode and a pressure supplied to an anode electrode is 1.5.

The relationships between the current density I and the cell voltage V in the fuel cell systems according to Inventive Example 4 and Comparative Example 2 is shown in FIG. 7. It can be seen from FIG. 7 that even when the pressure under which the air was supplied to the cathode electrodes 3, 24 is higher than the pressure under which the hydrogen was supplied to the anode electrode 2, the cell voltage V in the fuel cell system 40 according to Inventive Example 4 is higher than the cell voltage V in the fuel cell systems according to Comparative Example 2. That is, if a Pt—Mn alloy, instead of Pt, is used as a catalyst, then even when the pressure under which the air is supplied to the cathode electrodes 3, 24 is equal to or higher than the pressure under which the hydrogen is supplied to the anode electrode 2, the cell voltage V in the fuel cell system 40 increases, and the fuel cell system 40 produces a high output. A comparison of FIGS. 6 and 7 shows that the cell voltage V can be increased by making the pressure under which the air is supplied to the cathode electrodes 3, 24 higher than the pressure under which the hydrogen is supplied to the anode electrode 2.

The amount of Pt present in the cathode electrode 24 according to Inventive Example 4 is 0.88 mg/cm$^2$, whereas the amount of Pt present in the cathode electrode 3 according to Comparative Example 2 is 1.5 mg/cm$^2$, which is about 1.7 times the amount of Pt present in the cathode electrode 24 according to Inventive Example 4. It follows, therefore, that using a smaller amount of Pt—Mn alloy than Pt as a catalyst makes it possible to produce a higher-output fuel cell 20.

According to Inventive Example 4, the cell voltage V produced when the current density I was 1 A/cm$^2$ was 0.544 V and 0.582 V if the ratio of the pressure under which the air was supplied to the cathode electrodes 3, 24 to the pressure under which the hydrogen was supplied to the anode electrode 2 was 1 and 1.5, respectively. According to Comparative Example 2, the cell voltage V produced when the current density I was 1 A/cm$^2$ was 0.519 V and 0.543 V if the ratio of the pressure under which the air was supplied to the cathode electrodes 3, 24 to the pressure under which the hydrogen was supplied to the anode electrode 2 was 1 and 1.5, respectively. Therefore, the voltage increase caused by increasing the pressure under which the air was supplied to the cathode electrodes 3, 24 was 0.038 V according to Inventive Example 4 and 0.024 V according to Comparative Example 2. It can thus be seen from this result that using a Pt—Mn alloy as a catalyst makes it possible to produce a fuel cell 20 having a lower internal resistance and a higher output than using Pt as a catalyst.

As described above, the fuel cell according to the present invention includes anode and cathode electrodes, with at least the cathode electrode having an electrode catalyst layer containing a Pt—Mn-based alloy which has constituent elements of Pt and Mn. The Pt—Mn-based alloy is more inexpensive than Pt on an equal amount basis, but has an electric conductivity which is essentially the same as the electric conductivity of Pt. Therefore, a fuel cell which has an electric power generating capability that is essentially the same as a fuel cell containing Pt as a catalyst can be manufactured at a reduced cost. In particular, if a Pt—Mn alloy is selected as the Pt—Mn-based alloy, then it is possible to construct a high-output fuel cell having a low internal resistance using a smaller amount of Pt—Mn alloy than Pt.

For operating the fuel cell, it is preferable to make the pressure at the cathode electrode higher than the pressure at the anode electrode for greatly increasing the reaction efficiency of various electrode reactions at the anode and cathode electrodes, i.e., the energy conversion efficiency, thereby to increase the output of the fuel cell.

Although certain preferred embodiments of the present invention have been shown and described in detail, it should be understood that various changes and modifications may be made therein without departing from the scope of the appended claims.

What is claimed is:

1. A fuel cell comprising:
   a unit cell comprising an electrolyte electrode assembly having an anode electrode, a cathode electrode, and an electrolyte of a basic polymer impregnated with an acidic electrolytic solution serving as a hydrogen ion conductor, and a pair of separators sandwiching said electrolyte electrode assembly therebetween; and
   said anode electrode and said cathode electrode having respective gas diffusion layers and respective electrode catalyst layers;
   said electrode catalyst layer of at least said cathode electrode consisting of carrier particles directly coated onto the gas diffusion layer through a screen printing process, the carrier particles containing a Pt—Mn-based alloy having constituent elements of Pt and Mn.

2. A fuel cell according to claim 1, wherein said Pt—Mn-based alloy comprises a Pt—Mn binary alloy.

3. A fuel cell according to claim 2, wherein said Pt—Mn binary alloy contains Pt at a composition ratio ranging from 1 to 91 weight % and Mn at a composition ratio ranging from 99 to 9 weight %.

4. A fuel cell according to claim 1, wherein said basic polymer has a monomer of secondary amine as a structural unit.

5. A fuel cell according to claim 4, wherein said basic polymer comprises polybenzimidazole.

6. A fuel cell according to claim 1, further comprising means for operating the fuel cell such that a pressure at said cathode electrode is higher than a pressure at said anode electrode.

7. A fuel cell comprising:
   a unit cell comprising an electrolyte electrode assembly having an anode electrode, a cathode electrode, and an electrolyte of a basic polymer impregnated with an acidic electrolytic solution serving as a hydrogen ion conductor, and a pair of separators sandwiching said electrolyte electrode assembly therebetween; and
   said anode electrode and said cathode electrode having respective gas diffusion layers and respective electrode catalyst layers;
   said electrode catalyst layer of said cathode electrode and said electrode catalyst layer of said anode electrode containing a Pt—Mn-based alloy having constituent elements of Pt and Mn, wherein an amount of Pt—Mn alloy in the cathode electrode is greater than an amount of Pt—Mn alloy in the anode electrode.

8. A fuel cell according to claim 7, wherein said Pt—Mn-based alloy comprises a Pt—Mn binary alloy.

9. A fuel cell according to claim 8, wherein said Pt—Mn binary alloy contains Pt at a composition ratio ranging from 1 to 91 weight % and Mn at a composition ratio ranging from 99 to 9 weight %.

10. A fuel cell according to claim 7, wherein said basic polymer has a monomer of secondary amine as a structural unit.

11. A fuel cell according to claim 10, wherein said basic polymer comprises polybenzimidazole.

12. A fuel cell according to claim 7, further comprising means for operating the fuel cell such that a pressure at said cathode electrode is higher than a pressure at said anode electrode.

* * * * *